(12) United States Patent
Oomori

(10) Patent No.: US 9,951,193 B2
(45) Date of Patent: Apr. 24, 2018

(54) RESIN FOAM COMPOSITION AND FOAM, AND WALLPAPER

(71) Applicant: Toppan Printing Co., Ltd., Taito-ku, Tokyo (JP)

(72) Inventor: Yumiko Oomori, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 14/494,179

(22) Filed: Sep. 23, 2014

(65) Prior Publication Data

US 2015/0010746 A1 Jan. 8, 2015

Related U.S. Application Data

(63) Continuation of application No. PCT/JP2013/058923, filed on Mar. 27, 2013.

(30) Foreign Application Priority Data

Mar. 30, 2012 (JP) ................. 2012-078562
Mar. 30, 2012 (JP) ................. 2012-078820

(51) Int. Cl.

| C08J 9/00 | (2006.01) |
|---|---|
| C08L 1/04 | (2006.01) |
| C08L 23/08 | (2006.01) |
| C08J 9/28 | (2006.01) |
| C08J 9/30 | (2006.01) |
| D21H 11/18 | (2006.01) |
| D21H 19/70 | (2006.01) |
| D21H 21/56 | (2006.01) |
| B05D 3/00 | (2006.01) |
| D21H 19/10 | (2006.01) |
| D21H 27/20 | (2006.01) |
| C09J 175/04 | (2006.01) |
| B82Y 30/00 | (2011.01) |
| C08G 101/00 | (2006.01) |

(52) U.S. Cl.
CPC ............ *C08J 9/0085* (2013.01); *B05D 3/007* (2013.01); *C08J 9/0076* (2013.01); *C08J 9/28* (2013.01); *C08J 9/30* (2013.01); *C08L 1/04* (2013.01); *C08L 23/0853* (2013.01); *C09J 175/04* (2013.01); *D21H 11/18* (2013.01); *D21H 19/10* (2013.01); *D21H 19/70* (2013.01); *D21H 21/56* (2013.01); *D21H 27/20* (2013.01); *B82Y 30/00* (2013.01); *C08G 2101/00* (2013.01); *C08J 2201/0504* (2013.01); *Y10T 428/249986* (2015.04); *Y10T 428/31982* (2015.04)

(58) Field of Classification Search
CPC ....... C08L 23/0853; C08J 9/0085; D21H 9/10
See application file for complete search history.

(56) References Cited

U.S. PATENT DOCUMENTS

| 2,238,956 | A | * | 4/1941 | Strother ............... C09D 127/06 524/156 |
|---|---|---|---|---|
| 6,346,557 | B1 | | 2/2002 | Argy et al. |
| 2006/0178264 | A1 | | 8/2006 | Kameshima et al. |
| 2007/0148213 | A1 | * | 6/2007 | Ibrahim ............... A61K 8/0208 424/443 |
| 2007/0287345 | A1 | * | 12/2007 | Confalone ............... B41M 3/18 442/164 |
| 2010/0233481 | A1 | | 9/2010 | Isogai et al. |
| 2011/0008638 | A1 | | 1/2011 | Miyawaki et al. |
| 2012/0283363 | A1 | | 11/2012 | Kumamoto et al. |

FOREIGN PATENT DOCUMENTS

| CN | 1489624 A | 4/2004 |
|---|---|---|
| CN | 1764536 A | 4/2006 |
| CN | 101874043 A | 10/2010 |
| CN | 102352115 A | 2/2012 |
| EP | 2 267 222 A1 | 12/2010 |
| JP | 07290624 A * | 11/1995 |
| JP | 2001-513582 A | 9/2001 |
| JP | 2009-203412 A | 9/2009 |
| JP | 2009-263851 A | 11/2009 |
| JP | 2010-215872 A | 9/2010 |
| JP | 2011-094312 A | 5/2011 |
| JP | 2012-236983 A | 12/2012 |
| WO | WO 2010058148 A1 * | 5/2010 |
| WO | WO-2011/071156 A1 | 6/2011 |
| WO | WO-2012/124652 A1 | 9/2012 |
| WO | WO-2013/035786 A1 | 3/2013 |

OTHER PUBLICATIONS

Translation of JP 07-290624. See above for date and inventor.*
International Search Report dated May 13, 2014 issue in Application No. PCT/JP2013/058923.
European Search Report dated Sep. 9, 2015 issued in EP13769705.8.
First Office Action for Chinese Patent Application No. 201380015046.4 dated Apr. 6, 2016.
Second Office Action issued in Chinese Patent Application No. 201380015046.4 dated Nov. 23, 2016.
Office Action dated Jun. 15, 2017 in Chinese Patent Application No. 201380015046.4.

* cited by examiner

*Primary Examiner* — Victor S Chang
(74) *Attorney, Agent, or Firm* — Foley & Lardner LLP

(57) ABSTRACT

A resin foam composition comprises, at least, a resin emulsion and cellulose nanofibers.

10 Claims, No Drawings

RESIN FOAM COMPOSITION AND FOAM, AND WALLPAPER

CROSS-REFERENCE TO RELATED PATENT APPLICATIONS

This application is a continuation application filed under 35 U.S.C. 111(a) claiming the benefit under 35 U.S.C. § § 120 and 365(c) of PCT International Application No. PCT/JP2013/058923 filed on Mar. 27, 2013, which is based upon and claims the benefit of priority of Japanese Application No. 2012-078562 filed on Mar. 30, 2012 and Japanese Application No. 2012-078820 filed on Mar. 30, 2012, the entire contents of which are hereby incorporated by reference in their entireties.

BACKGROUND OF THE INVENTION

Technical Field

This invention relates to a foam adapted for use, for example, as an interior material in buildings and a resin foam composition for preparing a foam, and also to a wallpaper suited as an interior material in buildings.

Background Art

Resin foams are lightweight, excellent in heat insulation and good at designability and texture, for which they are in wide use, for example, as a building material such as a wallpaper or the like (see, for example, Patent Literature 1).

For a wallpaper used as an interior material, there may be some examples of a foam that is lightweight, excellent in heat insulation, and good at designability and texture (see, for example, Patent Literature 1). A sheet-shaped foam and a wallpaper provided with a foam layer made of a foam can be fabricated according to a method wherein a resin composition obtained, for example, by adding a foaming agent to a resin emulsion is coated onto a substrate, dried and foamed.

CITATION LIST

Patent Literature

[PTL 1]: JP-A-2011-94312

SUMMARY OF THE INVENTION

Technical Problem

However, such a foam has cells therein, so that it is lightweight and excellent in heat insulation, but also with a tendency to lack strength.

Although it is favorable for foams to obtain a satisfactory foaming ratio, there may be some concern that a higher foaming ratio results in more decreased strength.

For building materials such as wallpapers and the like, there have been recently demanded from the standpoint of residential environment concerns more environment-friendly materials that allow for reduced emissions of adhesive-derived VOC (volatile organic compounds), that can adsorb odorous or allergic substances, and that are able to control humidity.

The invention has been made under such circumstances as set out above and has as an object the provision of a resin foam composition wherein a high foaming ratio is obtained and from which a foam having excellent strength can be fabricated, and also a foam using the same.

Further, the invention as another object the provision of a wallpaper that canadsorb at least some odorous substances and control some humidity and is thus more environment-friendly.

Solution to Problem

A resin foam composition according to a first embodiment of the invention comprises, at least, a resin emulsion and cellulose nanofibers.

Preferably, the cellulose nanofibers are modified with a carboxyl group whose amount is at about 0.1-3.5 mmol/g.

It is further preferred that the resin foam composition of the first embodiment of the invention contains a crosslinking agent.

A foam of a second embodiment of the invention is prepared from the resin foam composition of the invention.

A method for fabricating a foam according to a third embodiment of the invention comprises the steps of coating on a substrate a resin foam composition of the invention, and then drying the thus coated resin foam composition.

The substrate is preferably a paper substrate.

The wallpaper of a fourth embodiment of the invention has a resin layer containing, at least, a resin and cellulose nanofibers.

The cellulose nanofibers are preferably modified with a carboxyl group whose amount is at about 0.1-3.5 mmol/g.

The resin layer is preferably made of a foam.

Advantageous Effects of Invention

According to the invention, there are provided a resin foam composition wherein a high foaming ratio is obtained and which is enabled to fabricate a foam of excellent strength, and also a foam obtained by using same.

Moreover, there can be provided a wallpaper which is more able to adsorb odorous substances and control humidity and is thus more environment-friendly.

DETAILED DESCRIPTION OF THE PREFERRED EMBODIMENTS

Description of Embodiments
(First Embodiment)

The resin foam composition (which may be sometimes referred to simply as the composition) of the first embodiment of the invention contains, at least, a resin emulsion and nanofibers.
(Resin Emulsion)

The resin emulsion is one wherein a resin (at least one of a synthetic resin or a natural resin) is dispersed in water. The resin contained therein is a matrix component (base component) of a foam product.

The resins can include, for example, vinyl acetate resins, ethylene-vinyl ester resins, acrylic resins, ethylene-(meth) acrylic ester copolymers, polyurethane resins, polyester resins, epoxy resins, silicone resins, polybutene resins, polybutadiene resins, styrene-butadiene copolymers and the like. Copolymers of two or more monomers for the above resins or blends of two or more of the resins may also be used.

Of these resins, polyurethane resins and ethylene-vinyl ester-acrylic resin copolymers are preferred. The vinyl ester units include, for example, vinyl acetate, vinyl propionate, vinyl butyrate and the like, of which resins having, at least, a vinyl acetate unit used as a vinyl ester unit are preferred.

The resin emulsion is preferably used in such a way that the amount of the resin is preferably at 1-85 mass %, more preferably 10 to 80 mass % when the resin foam composition is taken as 100 mass %. The range indicated above is favorable because of the excellence in viscosity and foaming property of the composition and the excellence in handleability during fabrication of foams.

(Cellulose Nanofibers)

Cellulose nanofibers (which may be sometimes referred to as CSNF hereinafter) means fibers obtained by fibrillating starting celluloses to the nanometer level. When using the cellulose nanofibers, there can be obtained a resin foam composition capable of fabricating a foam that is improved or excellent in strength and rate of elongation. If CSNF is contained in the composition during drying and foaming thereof, the resulting cells are unlikely to be destroyed or coalesce, with the likelihood of obtaining a foam of a high foaming ratio provided with closed cells. The foams obtained from a composition containing CSNF are less likely to stick to one another and are thus excellent in blocking resistance.

The foaming ratio is a ratio of the volume of a foam (after foaming) to the volume of a resin foaming composition used for foam formation.

As CSNF, mention is preferably made of carboxyl group-modified CSNF (which may be sometimes referred to as modified CSNF hereinafter) prepared by the steps of modifying cellulose by introducing a carboxyl group on the surfaces thereof and pulverizing the modified celluloses into fine pieces of nano order.

The carboxyl group of the modified CSNF may be either of an acid form (—COOH) or a salt form (—COO—). In addition, derivatives of the carboxyl group may be used including an aldehyde group, an ester group or an amide group represented by COO—$NR_2$ (wherein R is H, an alkyl group, a benzyl group, a phenyl group or a hydroxylalkyl group and two R's may be the same or different), all derived from the carboxyl group. Taking account of the viscosity of the composition and affinity for a resin, an acid form (—COOH), an ammonium salt form or a salt form such as an organic alkali salt form is preferred. The organic alkaline salts include any of amines and quaternary oxonium compounds having a hydroxide ion as a counter ion and including quaternary ammonium compounds. Examples include amines such as various types of aliphatic amines, aromatic amines, diamines and the like, and organic onium compounds having a hydroxide ion as a counter ion and including quaternary ammonium compounds represented by $NR_4OH$ (wherein R represents an alkyl group, a benzyl group, a phenyl group or a hydroxyalkyl group and four R's may be the same or different) and making use of a hydroxide ion as a counter ion, such as tetramethylammonium hydroxide, tetraethylammonium hydroxide, tetra-n-butylammonium hydroxide, benzyltrimethylammonium hydroxide, 2-hydroxyethyltrimethylammonium hydroxide and the like, phosphonium hydroxide compounds such as tetraethylphosphonium hydroxide, oxonium hydroxide compounds, sulfonium hydroxide compounds and the like.

Although CSNF has high strength and a high elastic modulus, modified CSNF whose surface is modified with a carboxyl group especially exhibits very good dispersibility in water aside from the above characteristics. Hence, when the modified CSNF is mixed with a resin emulsion, good dispersion is obtained, thereby providing a composition that is able to fabricate a foam that is better in strength and elastic modulus.

The starting celluloses that can be used include wood pulps (wood pulps obtained by different types of pulping processes, such as sulfite pulp, kraft pulp and the like), non-wood pulps, waste paper pulp, cotton, bacteria pulp, valonia cellulose, Hoya cellulose, fine cellulose, microcrystalline cellulose and the like. Especially, natural cellulose having cellulose I crystal structure is preferred. The natural cellulose having cellulose I crystal structure has a crystal region therein, and the crystal region is not attacked during the modification step, but only surfaces are oxidized. More particularly, when natural cellulose is used as a starting material, only the surfaces can be oxidized while keeping the crystal structure, with the likelihood of forming nano fibers without division into individual molecules.

For a specific procedure of the modification step, it is preferred to use a method of oxidizing starting celluloses in the presence of an N-oxyl compound (catalyst) with the aid of a co-oxidant. According to this procedure, while keeping the structure of the cellulose to the extent possible, the primary hydroxyl group (at the C-6 position) is selectively oxidized to obtain a carboxyl group.

The N-oxyl compound is not critical in type and 2,2,6,6-tetramethylpiperidinooxy radical (TEMPO) is preferably used.

As a co-oxidant, there can be used those oxidants capable of promoting the oxidation reaction and including a halogen, a hypohalous acid, a halous acid, a perhaloric acid or a salt thereof, a halogen oxide, a nitrogen oxide, a peroxide or the like. More particularly, sodium hypochlorite is preferred in view of the ease in availability and reactivity.

In the reaction system for the oxidation reaction, a bromide or iodide may be used so as to permit the oxidation reaction to proceed more smoothly thereby enhancing an efficiency of introducing the carboxyl group. The bromide preferably includes sodium bromide in view of its cost and stability.

The amount of TEMPO may be chosen to enables it to also function as a catalyst. As to the amount of a co-oxidant or a bromide or iodide, an amount sufficient to promote the oxidation reaction may be used.

The reaction system for the oxidation reaction should preferably be kept alkaline and is more preferably kept at a pH of 9-11. More particularly, it is preferred that an alkaline aqueous solution such as an aqueous solution of sodium hydroxide, lithium hydroxide or potassium hydroxide or an ammonia aqueous solution is appropriately added to the reaction solution to prevent the lowering of pH during the reaction thereby keeping the pH alkaline. For the alkaline aqueous solution, use of sodium hydroxide is preferred in view of the cost and ease in availability.

It will be noted that pH used herein means a value measured at about 20° C.

For completion of the oxidation reaction, it is sometimes necessary that while keeping the pH in the system, an alcohol be added so as to completely finish the reaction of the co-oxidant. The alcohol used preferably includes a low-molecular-weight alcohol such as methanol, ethanol or propanol from the standpoint of quickly completing the reaction. Of the alcohols, methanol is more preferred in view of the safety of by-products formed by the reaction.

The completion of the oxidation reaction is carried out at timing when it is judged that a desired carboxyl group has been introduced.

For instance, an amount of the carboxyl group introduced has very good correlation with an amount of an alkali that is added for pH adjustment and consumed in association with the oxidation reaction. Accordingly, for different types of starting materials and different oxidation conditions, a calibration curve showing the relation between the amount of a carboxyl group introduced and the amount of an alkali consumed has been made beforehand. During the oxidation reaction, the amount of an alkali consumed is monitored. From this, introduction of a desired carboxyl group can be judged from the amount of the alkali consumed, at which the oxidation reaction can be completed. For example, with the case of using softwood kraft pulp as a starting material, the amount of a carboxyl group measured at the time when about 2.5 mmol/g of an alkali was consumed was found to be 1.6 mmol/g, and the amount of a carboxyl group measured at the time when about 2.8 mmol/g of an alkali was consumed was found to be 1.8 mmol/g. In this way, data can be preliminarily collected to make a calibration curve, from which the amount of a carboxyl group introduced can be found from the amount of an alkali consumed.

It will be noted that the amount of an introduced carboxyl group depends on the type of cellulose used as a starting material and the amount of a co-oxidant added. When the surface of cellulose is swollen under which the reaction is carried out, an amount of an introduced carboxyl group can be increased over the case where the reaction is performed without swelling. For example, when using wood pulp as a starting material, the amount of the carboxyl group being as low as about 1.6 mmol/g for the case of no swelling can be increased to not less than 2.0 mmol/g when the reaction is run after swelling of the surface.

After completion of the oxidation reaction, the cellulose introduced with a carboxyl group on the surface by the oxidation reaction is rinsed. As stated before, where the oxidation reaction is carried out under alkaline conditions, the introduced carboxyl group forms a salt with the alkali. The rinsing may be performed in such a state where the carboxyl group forms a salt with the alkali, or may be made after an acid has been added for conversion into an acid form (carboxylic acid: —COOH). Alternatively, an organic solvent may be added so as to insolubilize the cellulose introduced with a carboxyl group on the surfaces thereof, followed by rinsing. Of these procedures, such a rinsing method of adding an acid for conversion into an acid form (carboxylic acid: —COOH) is preferred in view of handleability and yield. Water is preferred as a rinsing medium.

After completion of the modification step set out above, the modified cellulose obtained in the modification step is subjected to a nano-pulverization step of pulverizing the cellulose to the nanometer level.

More specifically, the modified cellulose is immersed in water serving as a dispersion medium, after which an alkali is added so as to preferably adjust the pH to 6-12. When the pulverization is carried out within such a pH range as indicated above, the modified cellulose can be fibrillated to the nanometer level by the electrostatic repulsion of the carboxyl groups to obtain a highly transparent dispersion. In contrast, when the pH is smaller than 6, particularly, smaller than 3, such repulsion is unlikely to occur and thus, the resulting dispersion becomes opaque. The alkalis used include aqueous solutions of sodium hydroxide, lithium hydroxide, potassium hydroxide and the like, and an ammonia aqueous solution. Besides, organic alkalis may also be used including tetramethylammonium hydroxide, tetraethylammonium hydroxide, tetrapropylammonium hydroxide, tetrabutylammonium hydroxide, benzyltrimethylammonium hydroxide and the like.

Where water is used as a dispersion medium in a manner as described above, a stable dispersion state is ensured. As a matter of course, a medium other than water may also be used depending on drying conditions and various purposes of improving or controlling the physical properties of the dispersion. As such a medium/solvent, mention is made, for example, of methanol, ethanol, isopropyl alcohol, tert-butanol, ethers, ketones and the like, one or more of which can be used.

For the nano pulverization, a high-pressure homogenizer, a ultrahigh-pressure homogenizer, a beads mill, a ball mill, a cutter mill, a jet mill, a grinder, a juicer mixer, a homo mixer, a ultrasonic homogenizer, a nanogenizer, aqueous counter collision can be used, with which treatment is carried out for an arbitrary time.

When nano pulverization is performed in this way, the resulting dispersion becomes gradually viscous and a high energy is thus required as pulverization proceeds. Accordingly, the amount of the modified cellulose in the dispersion should preferably be set at not larger than 10 mass % before commencement of the pulverization.

The modification and pulverization steps are carried out in a manner as set out above to obtain modified CSNF having a carboxyl group at the C-6 position.

The amount of the carboxyl group of the modified CSNF (i.e. a molar amount of the carboxyl group contained in one gram of the modified CSNF) is preferably about 0.1-3.5 mmol/g. If the amount is not less than the lower limit (about 0.1 mmol/g) of the above range, the dispersibility of the modified CSNF in the composition can become proper and a proper viscosity is ensured, thus being favorable in view of handleability. On the other hand, if the amount is not larger than the upper limit (about 3.5 mmol/g) of the range, a finally obtained foam possesses a good resistance to water.

It will be noted that the amount of the carboxyl group of the modified CSNF can be measured according to a conductometric titration method using, for example, a 0.5N sodium hydroxide aqueous solution.

The fiber width of the modified CSNF is preferably at about 1-200 nm on average. Such a fiber width ensures more excellent dispersibility in the composition. Eventually, there can be formed a composition capable of fabricating a foam that has more excellent strength and ratio of elongation. Especially, the width within a range of about 1-50 nm results in a foam whose appearance, such as a surface gloss, is good. The fiber length is preferably at about 100-1000 nm on average. The modified CSNF of a high aspect ratio having such a fiber width and length as indicated above is more improved or excellent in strength and is able to form a composition capable of fabricating a high-strength foam in small amounts.

It should be noted that the average values of the fiber width and length are obtained by measuring and averaging widths and lengths of a plurality of modified CSNF fibers by use of an atomic force microscope, respectively. On this occasion, the number of samples to be measured should be at least twenty.

The amount of the CSNF in a resin foam composition is preferably within a range of about 0.1-100 parts by mass, more preferably about 0.2-50 parts by mass, per 100 parts by mass of the resin (solid content) in the composition. If the amount is not larger than the lower limit (0.1 part by mass) of the above range, the effect of added CSNF develops well. If the amount is not larger than the upper limit (100 parts by mass) of the range, problems ascribed to too much an amount of CSNF (e.g. coating properties depending on the viscousness of CSNF deteriorate and a drying efficiency lowers due to too much moisture entrained in association with introduced CSNF) are unlikely to occur.

(Foaming Agent)

The composition of the first embodiment of the invention may not contain a foaming agent. In this case, although forced foaming is possible under physical agitation, one or more of foaming agents may be contained.

As a foaming agent, mention is made of volatile foaming agents, aliphatic hydrocarbons (propane, pentane, hexane, heptane, benzene, neopentane and the like), chlorinated aliphatic hydrocarbons (methyl chloride, methylene chloride, trichloroethylene, dichloroethane and the like), fluorinated aliphatic hydrocarbons (trichlorofluoromethane, dichloro-terafluoroethane and the like), inorganic foaming agents (sodium bicarbonate, ammonium carbonate, magnesium carbonate, ammonium nitrite, ferrous oxalate, sodium borohydride and the like), and organic foaming agents (azo foaming agents, ADCA agents such as azodicarbonamide, azobisisobutyronitrile, nitroso foaming agents, DPT agents such as dinitrosopentamethylenetetramine, N,N-dinitroso-N,N-dimethylterepthalamide, hydrazide foaming agents, p-toluenesulfonylhydrazide, p,p-oxy-bis-(benzenesulfonylhydrazide), benzenesulfonylhydrazide, trihydradinotriazine, and the like).

The foaming agents may further include derivatives of the above foaming agents and those foaming agents treated to improve stability, dispersability and the like. Alternatively, foaming agents encapsulated with resins (microcapsule foaming agents) may also be used.

Of the foaming agents indicated above, volatile foaming agents and aliphatic hydrocarbons that can be used in aqueous systems without decomposition are preferred. Especially, hexane, heptane, benzene and DCA foaming agents are more preferred. With these foaming agents, the rate of volatilization is generally too high, for which some difficulty might be involved in providing a foam while forming plenty of closed cells. However, with a system using CSNF according to the first embodiment of the invention, the composition can be increased in viscosity by addition of CSNF, so that even when such foaming agents as set out above are used, closed cells can be formed in a satisfactory manner.

These foaming agents are preferably added in an amount of not larger than about 30 parts by mass per 100 parts by mass of the resin (solid content) in the resin foaming composition although depending on the type of foaming agent and the foaming ratio.

(Crosslinking Agent)

As a crosslinking agent, one or more of compounds having a reactive functional group such as a carbodiimide group, an oxazoline group, an isocyanate group, an epoxy group, an amino group or the like may be added to the composition of the first embodiment of the invention. The addition of a crosslinking agent results in the interfacial linkage between the resin contained in a resin emulsion and CSNF and also in the impartment of strain hardenability during foaming, so that foams having large-sized closed cells can be fabricated. Of these crosslinking agents, compounds having one or more of a carbodiimide group, an oxazoline group and an isocyanate group show a good efficiency of reaction with a hydroxyl group or a carboxyl group contained in the modified CSNF, and the reaction can proceed at low temperatures so that a better effect of the addition can be expected. Especially, the carbodiimide group and oxazoline group undergo gentle reaction at low temperatures such as room temperature and thus, a high efficiency is shown in a small amount of the addition.

Where these crosslinking agents are added, the amount is preferably within a range of about 0.01-30 parts by mass per 100 parts by the resin (solid content) in the resin foam composition.

(Other Components)

Besides, the resin foam composition may further contain components, particles or filters such as of calcium carbonate, titanium oxide, aluminum hydroxide, zinc oxide, talc, kaolin, clay, and other dyes and pigments in amounts within a range, for example, of not larger than 200 parts by mass per 100 parts by mass of the resin (solid content) in the composition.

The composition may further contain a stabilizer, a plasticizer, a colorant, a radical scavenger, a defoaming agent, a surfactant, a solvent such as an alcohol, a coloring agent, a lubricant, a UV absorber, metal particles, carbon materials, a humectant, a drying agent, an adsorbent and the like within ranges not impeding the performance thereof.

The composition may still further contain an organic solvent other than water (an alcohol, an ester, a ketone or the like) in a small amount within a range not influencing the formation of emulsion. In this case, the content is conveniently within a range of not larger than about 30 mass % in 100 mass % of the composition.

(Foam and its Fabrication Method)

The foam of the first embodiment of the invention is fabricated from the above-described resin foam composition, for example, according to a method including at least the steps of coating a resin foam composition on a substrate and drying the thus coated resin foam composition.

Where forced foaming under physical agitation is performed for forming the resin foam composition, the resin foam composition is prepared and subsequently agitated by means of an agitating device such as a mixer, followed by coating and drying steps.

The temperature of the drying step is set, for example, within a range of 50-180° C. although depending on the presence or absence of a foaming agent in the composition and the type of foaming agent if present. If necessary, a heating step may be separately provided after the drying step thereby causing a foaming agent to be foamed.

In this way, a laminate having, on a substrate, a foam layer made of a foam is obtained.

The thickness of the foam layer is not critical and is preferably, for example, within a range of 1-10 mm in the case where a laminate having the foam layer is used as an interior material.

The substrate used includes, aside from a sheet-shaped substrate such as a paper substrate, a three-dimensionally shaped substrate. For instance, where a laminate having a foam layer therein is used as an interior material, a sheet-shaped substrate is employed and particularly, a paper substrate is preferred. For the paper substrate, mention is made, for example, high-quality paper, coated paper or synthetic paper. The basis weight of the paper substrate is not critical and is, for example, 40-300 g/m$^2$. Where the composition is applied onto a sheet-shaped substrate, it can be coated on at least one surface of the substrate.

Because the resin foam composition described hereinabove contains CSNF, the cells formed during the fabrication of a foam are unlikely to be destroyed or coalesce, with the likelihood of obtaining a foam of a high foaming ratio provided with closed cells. The resulting foam contains CSNF, so that although the foam has cells inside thereof, strength and a rate of elongation are excellent. Thus, when using such a resin foam composition as set forth hereinabove, a high foaming ratio is obtained and a foam of excellent strength can be fabricated.

(Second Embodiment)

The second embodiment of the invention is now described in detail.

[Wallpaper]

The wallpaper of the second embodiment of the invention has a resin layer containing, at least, a resin and cellulose nanofibers and is conveniently formed from an aqueous emulsion resin composition containing, at least, a resin emulsion and cellulose nanofibers.

The wallpaper of the second embodiment of the invention may include, aside from the resin layer, a base paper (lining paper) and other layers. The resin layer may be made of a foam having cells. The use of a foam is preferred in view of lightweight properties, heat-insulating properties, designability and texture.

The thickness of the resin layer is not critical and is preferably, for example, within a range of 1-10 mm.

(Resin (at Least One of a Synthetic Resin and a Natural Resin))

The resin is one serving as a matrix component (base component) of the resin layer and includes, for example, a vinyl acetate resin, an ethylene-vinyl ester resin, an acrylic resin, an ethylene-(meth)acrylic ester copolymer, a polyurethane resin, an epoxy resin, a silicone resin, a polybutene resin, a polybutadiene resin, a styrene-butadiene copolymer or the like. These resins may take the form of an emulsion after dispersion in water. These resins may be copolymers of two or more of monomers thereof or may be a mixture of two or more of these resins.

Of the resins, polyurethane resins, ethylene-vinyl ester copolymers, ethylene-vinyl ester-acrylic resin copolymers are preferred. The vinyl ester unit includes, for example, vinyl acetate, vinyl propionate, vinyl butyrate and the like. Of these, resins having a vinyl acetate unit as a vinyl ester unit are preferred.

The resin may further contain a crosslinking agent consisting of one or more of compounds having a reactive function group such as a carbodiimide group, an oxazoline group, an isocyanate group, an epoxy group, an amino group or the like. The addition of the crosslinking agent contributes to improving the water resistance of the resin layer. If the resin layer is formed as a foam, strain hardenability is imparted and thus, a foam having large-sized closed cells can be provided. Of the crosslinking agents, compounds having one or more of a carbodiimide group, an oxazoline group and an isocyanate group undergo efficient reaction with a hydroxyl group or carboxyl group contained in a modified CSNF described hereinafter, and the reaction is able to proceed at low temperatures thereby obtaining a better effect of the addition. Especially, the carbodiimide group and oxazoline group allow gentle reaction at a low temperature such as room temperature and a good efficiency of the addition is shown even in small amounts.

(Cellulose Nanofibers)

Cellulose nanofibers (which may be sometimes referred to as CSNF hereinafter) are ones obtained by fibrillating starting celluloses to nano order. They have the capability of more adsorbing odorous substances generated indoors or allergic substances such as formaldehyde and more capability of humidity control for controlling an indoor humidity. The wallpaper of the second embodiment of the invention has, aside from the resin layer, a base paper and other layers. Where an adhesive is provided for adhesion of these layers, CSNF is able to adsorb adhesive-derived components such as VOCs and shows the action of preventing indoor emission of VOCs. Besides, CSNF has an effect of improving the strength and rate of elongation of the resin layer and also an effect of improving a blocking resistance during storage of the wallpaper by preventing mutual adhesion of the resin layers.

Where a foam is provided as the resin layer and CSNF is present in the resin layer, the cells formed during foaming are unlikely to be destroyed or coalesce together, so that there can be obtained a foam provided with closed cells and having a high foaming ratio.

Preferred CSNF includes CSNF modified with a carboxyl group (which may be sometimes referred to as modified CSNF hereinafter), which is prepared by the step of modifying cellulose by introducing the a carboxyl group on the surfaces thereof and the nano pulverization step wherein the modified cellulose obtained in the modification step is subjected to nano pulverization.

The modified CSNF has very good dispersibility in water. Accordingly, the modified CSNF is well dispersed in an emulsion resin composition (which may be sometimes, hereinafter referred to as composition for resin layer formation) used as a starting material for the resin layer, enabling high dispersion in the resin layer to satisfactorily show the effect of addition of the modified CSNF.

In the resin layer making use of the modified CSNF, at least a part of the carboxyl group of the modified CSNF lies on the surfaces of the resin layer as a nano structure, ensuring more excellent capabilities of adsorption and humidity control.

The carboxyl group of the modified CSNF may be either of an acid form (—COOH) or of a salt form (—COO—). The derivatives of the carboxyl group may also be used including, all derived from a carboxyl group, an aldehyde group, an ester group, and an amide group represented by COOR—NR$_2$ (wherein R represents H, an alkyl group, a benzyl group, a phenyl group or a hydroxyalkyl group and two R's may be the same or different). Taking account of the viscosity of the composition and affinity for resin, an acid form (—COOH) or a salt form such as an ammonium salt form or an organic alkali salt form is preferred. The organic alkali salts include any of amines and quaternary oxonium compounds having a hydroxide ion as a counter ion and including quaternary ammonium compounds. Specific mention is made of amines such as various types of aliphatic amines, aromatic amines, diamines and the like, and organic onium compounds having a hydroxide counter ion and including quaternary ammonium compounds represented by NR$_4$OH (wherein R represents an alkyl group, a benzyl group, a phenyl group or a hydroxyalkyl group and four R's may be the same or different) and making use of a hydroxide ion as a counter ion, such as tetramethylammonium hydroxide, tetraethylammonium hydroxide, tetra-n-butylammonium hydroxide, benzyltrimethylammonium hydroxide, 2-hydroxyethyltrimethylammonium hydroxide and the like, phosphonium hydroxide compounds such as tetraethylphosphonium hydroxide, oxonium hydroxide compounds, sulfonium hydroxide compounds and the like.

The starting celluloses, the specific procedure of the modification step, and the specific procedure of the nano pulverization method are, respectively, the same as those described in the first embodiment.

The modification step and the nano pulverization step as set out above are carried out to obtain modified CSNF having a carboxyl group at the C-6 position.

The amount of the carboxyl group of the modified CSNF (i.e. a molar amount of the carboxyl group present in one gram of the modified CSNF) is preferably at about 0.1-3.5 mmol/g. Within this range, the capabilities of absorption and humidity control of the carboxyl group can be well shown. If the amount is not less than the lower limit (about 0.1 mmol/g) of the range, the dispersibility of the modified CSNF in the composition for resin layer formation and the viscosity of the composition, respectively, fall in moderate ranges, thus being favorable in view of handleability. On the other hand, when the amount is not larger than the upper limit (about 3.5 mmol/g), the water resistance of the resin layer becomes good.

It will be noted that the amount of the carboxyl group of the modified CSNF can be measured by a conductometric titration method using, for example, a 0.5N sodium hydroxide aqueous solution.

The fiber width of the modified CSNF is preferably at about 1-200 nm on average. Such a fiber width ensures more excellent dispersibility in the composition for resin layer formation. Eventually, a better effect of the addition of the modified CSNF can be shown. Especially, when the width is within a range of about 1-50 nm, the resulting resin layer has a good appearance, such as a surface gloss. The fiber length is preferably at about 100-1000 nm on average. The modified CSNF of a high aspect ratio having such a fiber width and length as indicated above is more improved it excellent in strength and can be advantageous in that strength of the resin layer is increased in small contents.

It is to be noted that the average values of the fiber width and length are obtained by measuring and averaging widths and lengths of a plurality of modified CSNF fibers by use of an atomic force microscope, respectively. On this occasion, the number of samples to be measured should be at least twenty.

(Amounts of Resin and CSNF)

The amounts of the resin and CSNF in the resin layer are preferably such that CSNF is in an amount of about 0.1-100 parts by mass, more preferably about 0.2-50 parts by mass, per 100 parts by mass of the resin (solid content). If the amount is not less than the lower limit (about 0.1 parts by mass) of the above range, the effect of the addition of the CSNF develops well. If the amount is not larger than the upper limit (about 100 parts by mass) of the range, problems caused by too much an amount of CSNF added (e.g. coating properties depending on the viscousness of CSNF can deteriorate and a drying efficiency can lower due to too much moisture entrained in association with introduced CSNF) are unlikely to occur.

(Other Components)

The resin layer may be made of a foam. The foaming method in that case may be, aside from forced foaming under physical agitation of the composition for resin layer formation, a method using one or more of foaming agents to provide a resin layer. With the case of a resin layer wherein a foaming agent is used, the resulting resin layer may contain components derived from the foaming agent.

The foaming agents are the same as in the foregoing first embodiment.

The resin layer may further contain particles or fillers such as of calcium carbonate, titanium oxide, aluminum hydroxide, zinc oxide, talc, kaolin, clay and other types of dyes and pigments in amounts within a range, for example, of not larger than 200 parts by mass per 100 parts by mass of the resin (solid content) in the composition.

Moreover, the resin layer may further contain a stabilizer, a plasticizer, a colorant, a radical scavenger, a defoaming agent, a surfactant, a solvent such as an alcohol, a coloring agent, a lubricant, a UV absorber, metal particles, carbon materials, a humectant, a drying agent, an adsorbent and the like within ranges not impeding the performance thereof.

[Method of Fabricating a Wallpaper]

The resin layer of the wallpaper of the second embodiment of the invention is conveniently formed from an aqueous composition for resin layer formation comprised of a resin emulsion and cellulose nanofibers and, if necessary, other components such as a foaming agent, a crosslinking agent and the like.

The wallpaper of the second embodiment of the invention may include, aside from the resin layer, a base paper (lining paper) serving as a substrate forming the resin layer thereon, and one or more of other layers. Especially, a structure comprising the resin layer formed on a base paper is preferred.

Where a wallpaper having the resin layer formed on a base paper is fabricated, there can be adopted a method which comprises, at least, the steps of coating a composition for resin layer formation onto a base paper and drying the thus coated composition. In this way, the wallpaper forming the resin layer on the base paper can be made.

In the case where the resin layer is formed of a foam obtained by forced foaming, a composition for resin layer formation is prepared and subsequently agitated by use of an agitator such as a mixer, followed by coating and drying steps.

The temperature of the drying step is set, for example, within a range of 50-180° C. although depending on the presence or absence of a foaming agent in the composition for resin layer formation and the type of foaming agent if present. If a foaming agent is used, a heating step may be separately provided after the drying step thereby causing the foaming agent to be foamed.

The amount of the resin (solid content) in the composition for resin layer formation is preferably at 1-85 mass %, more preferably at 10-80 mass % when the composition is taken as 100 mass %. This range is preferred in view of the fact that the composition is formulated within a proper range of viscosity and becomes excellent in handleability. The amount of CSNF is preferably within such a range as having illustrated with respect to its amount in the resin layer.

Where a foaming agent is added, the agent is preferably added within a range of not larger than about 30 parts by mass per 100 parts by mass of the resin (solid content) in the composition for resin layer formation although depending on the type of foaming agent and the foaming ratio. Where a crosslinking agent is added, the amount is preferably within a range of about 0.01-30 parts by mass per 100 parts by mass of the resin (solid content) in the composition.

The composition for resin layer formation may further contain, aside from water, an organic solvent (an alcohol, an ester, a ketone or the like) in a small amount within a range not influencing the formation of emulsion. In this case, the content is favorably within a range of not larger than about 30 mass % in 100 mass % of the composition.

The base paper includes, aside from paper and non-woven cloth, various types of resin sheets, laminates of these sheets bonded with an adhesive, which can be used without limitation so far as they are usable as a base paper for wallpaper. Especially, a paper substrate is preferred. The paper substrate includes, for example, high-quality paper, coated paper and synthetic paper. The weight basis of the paper substrate is not critical and is, for example, at 40-300 g/m$^2$.

Where the resin layer containing CSNF is formed on a base paper in this manner and the resin layer is exposed indoors, such capabilities of adsorption and humidity control as set out before are satisfactorily shown.

The resin layer may be further provided with other layer on a side opposite to a side to which the base paper is attached. In this arrangement, the resin layer containing CSNF is not exposed indoors, with the tendency that the capabilities of adsorption and humidity control lower. On the other hand, however, where the wallpaper per se has an adhesive therein, e.g. where the base paper is formed of a plurality of layers bonded through an adhesive or where other layer is attached on the resin layer through an adhesive, components derived from the adhesive, such as VOC, are adsorbed with the resin layer thereby improving the effect of preventing indoor emission of VOC.

Other preferred form of the wallpaper includes a structure having, on a base paper, one or more of other layers, on which a resin layer is formed as an overcoat layer, so that the resin layer is exposed indoors.

The wallpaper of the second embodiment of the invention having set forth above has a resin layer containing CSNF and thus, has the capability of more improved adsorbing odorous substances generated indoors or allergic substances such as formaldehyde and more improved capability of indoor humidity control. Where the wallpaper has an adhesive therein, adhesive-derived components such as VOC can be adsorbed and indoor emission of VOC can be prevented. The resin layer of the wallpaper of the second embodiment of the invention has excellent strength, ratio of elongation and blocking resistance due to the presence of CSNF.

Where the resin layer is formed of a foam, cells formed during foaming are unlikely to be destroyed or coalesce together due to the presence of CSNF in the resin layer, so that a foam of a high foaming ratio having closed cells can be obtained.

EXAMPLES

The invention is more particularly described by way of examples, which should not be construed as limiting the invention.

Preparatory Example 1

Dispersion (A) of modified CSNF was prepared in the following way.
(1) Modification Step 30 g of bleached softwood kraft pulp was suspended in 1800 g of distilled water to prepare a suspension. Separately, a solution of dissolving 0.3 g of TEMPO and 3 g of sodium bromide in 200 g of distilled water was prepared and subsequently added to the suspension, followed by controlling the temperature at 20° C.

220 g of a sodium hypochlorite aqueous solution (with a concentration of 2 mol/l and a density of 1.15 g/l) whose pH was adjusted to 10 by means of a 1N HCl aqueous solution was dropped in the suspension to commence oxidation reaction The temperature of the system was kept at 20° C. During the reaction, the pH lowered, whereupon a 0.5N sodium hydroxide aqueous solution was added so as to keep the pH at 10.

At the time when a consumption of sodium hydroxide reached 2.5 mmol per gram of cellulose, it was judged that a desired amount of carboxyl group was introduced (based on a preliminarily prepared calibration curve), and a sufficient amount of ethanol was added so as to stop the reaction. Thereafter, hydrochloric acid was added until the pH reached 3, followed by repeating washing with distilled water to obtain modified cellulose.

It will be noted that 0.1 g of the modified cellulose as a solid content was weighed and dispersed in water so that the concentration was at 1 mass %, to which hydrochloric acid was added for setting the pH at 3. Subsequently, the dispersion was subjected to a conductometric titration method using a 0.5N sodium hydroxide aqueous solution to determine an amount of the carboxyl group, revealing that the amount was 1.6 mmol per gram of the modified cellulose (i.e. cellulose whose surface was modified with a carboxyl group), that is, 1.6 mmol/g.
(2) Nano Pulverization Step Four grams of the modified cellulose obtained in (1) above was dispersed in 396 g of distilled water, to which a sodium hydroxide aqueous solution was added so that the pH was adjusted to 10. Next, the dispersion was subjected to nano pulverization by means of a mixer for 60 minutes to obtain dispersion (A) of the modified CSNF (having a concentration of the modified CSNF of 1 mass %).

The carboxyl group of the modified CSNF contained in the dispersion (A) was of the salt form (sodium).

The fiber width (on average) of the modified CSNF contained in the dispersion (A) was 2 nm and the fiber length (on average) was 400 nm (determined by observation through an atomic force microscope (AFM) with the number of samples measured being at 20).

[Several Measurements and their Evaluations]

The foams or laminates obtained in the respective Examples and Comparative Examples described hereinafter were subjected to the following measurements and evaluations. The results are shown in Table 1.
(1) Tensile Fracture Strength and Rate of Elongation The sheet-shaped foams obtained in Example 1 and Comparative Example 1 were each cut into an dumbbell form to provide a sample, followed by measurement of tensile fracture strength and a rate of elongation by use of a Tensilon tester (accorded to JIS K6400).
(2) Hoffman Scratch Test Hoffman Scratch: Using a Hoffman Scratch tester, the surfaces of foam layers of laminates obtained in Examples 3, 4 and Comparative Example 2 were scratched under the respective loads indicated in the table to visually judge the presence or absence of scratches.
(3) Blocking Resistance The laminates obtained Examples 2, 3 and Comparative Example 2 were each cut into a 10 cm square piece, after which the foam layer was bent and superposed so that the foam layer was turned inside. Using a blocking test, the piece was so set that a load of 2 kg/cm$^2$ was exerted thereon, followed by storing in an environment of 40° C. and 90% over one week to confirm the presence or absence of blocking (mutual adhesion of the foam layers).

Example 1

7 g of the dispersion (A) (having a modified CSNF concentration of 1 mass %) was added to 10 g of a polyurethane resin emulsion (solid (resin) concentration: 33 mass %) to prepare an aqueous emulsion resin composition for foam.

This composition was subjected to forced foaming under agitation by means of a whip mixer and cast on a Teflon (registered trade name) petri dish, dried at 120° C. and removed to obtain a sheet-shaped foam. The foam had a thickness of 2.5 mm.

Comparative Example 1

10 g of a polyurethane resin emulsion (solid (resin) concentration: 33 mass %) was subjected to forced foaming under agitation by means of a whip mixer to obtain a sheet-shaped foam in the same manner as in Example 1. The foam had a thickness of 0.5 mm.

Example 2

100 parts by mass of an ethylene-vinyl acetate-acrylic resin emulsion (solid (resin) concentration: 50 mass %), 50 parts by mass of the dispersion (A) (modified CSNF concentration: 1 mass %), 80 parts by mass of calcium carbonate (Super SSS, made by Maruo Calcium Co., Ltd.) and 15 parts by mass of titanium oxide (T-76, made by CSC Co., Ltd.) were mixed and dispersed to prepare an aqueous emulsion resin composition for foam.

This composition was subjected to forced foaming under agitation by means of a whip mixer and coated onto a paper substrate having a basis weight of 75 g/m$^2$ and dried at 120° C. to obtain a laminate wherein a foam layer made of the foam was formed on the paper substrate.

Example 3

Aside from the components mixed in Example 2, 5 parts by mass of heptane was further added, and mixed and dispersed to obtain an aqueous emulsion resin composition for foam.

The resin composition was coated onto a paper substrate having a weight basis of 75 g/m$^2$ and dried at 120° C. for foaming to obtain a laminate wherein a foam layer made of the foam was formed on the paper substrate.

Example 4

In the same manner as in Example 4 except that 5 parts by mass of an ADCA foaming agent was used instead of 5 parts by mass of heptane, a laminate having a foam layer made of a foam formed on the paper substrate was obtained.

Comparative Example 2

In the same manner as in Example 3 except that 50 parts by mass of water was used instead of 50 parts by mass of the dispersion (A), there was obtained a laminate wherein a foam layer made of a foam was formed on the paper substrate.

Discussion

Comparison between Example 1 and Comparative Example 1 reveals that the foams containing the modified CSNF are excellent in tensile fracture strength, rate of elongation and foaming ratio. The foam obtained in Example 1 has a thickness of 2.5 mm, whereas the foam obtained in Comparative Example 1 has a thickness of 0.5 mm, from which it will be seen that a high foaming ratio is attained when the modified CSNF is contained. Comparison between Example 3 and Comparative Example 2 also demonstrates that a high foaming ratio can be achieved when the modified CSNF is contained.

The results of the Hoffman Scratch test of Examples 3,4 and Comparative Example 2 reveal that the foam layers containing the modified CSNF are excellent in scratch resistance.

The results of the blocking resistance of Examples 2,4 and Comparative Example 2 reveal that the foam layers containing the modified CSNF are excellent in blocking resistance.

Preparatory Example 2

In Preparatory Example 2, an example of the invention in the second embodiment is particularly described.

Similar to Example 1 described above, dispersion (A) of the modified CSNF was prepared.

The fiber width (on average) of the modified CSNF contained in the dispersion (A) was 2 nm and the fiber length (on average) was 400 nm (when determined by observation through anatomic force microscope (AFM) with the number of samples being at 10).

Preparatory Example 3

Dispersion (B) of modified CSNF was prepared in the following manner.

In the same manner as in Preparatory Example 1, the modification step (1) was carried out. Thereafter, hydrochloric acid was added so that the carboxyl group of the modified CSNF was converted to an acid form. The dispersion of the modified CSNF was adjusted to 2 mass % and neutralized with tetramethylammonium hydroxide to a pH of 7, followed by nano pulverization step using a super high-pressure homogenizer to obtain dispersion (B) of CSNF modified with a carboxyl group of an organic alkali salt form (with a concentration of modified CSNF of 2 mass %).

TABLE 1

| | | Example 1 | Comp. Ex. 1 | Example 2 | Example 3 | Example 4 | Comp. Ex. 4 |
|---|---|---|---|---|---|---|---|
| Tensile fracture strength (N) | | 71 | 40 | — | — | — | — |
| Rate of elongation(%) | | 210 | 140 | — | — | — | — |
| Thickness (mm) | | 2.5 | 0.5 | | | | |
| Foaming ratio (times) | | — | — | — | 3 | 5 | 2 |
| Hoffman Scratch test | Load: 500 g | — | — | — | No scratch | No scratch | No scratch |
| | Load: 600 g | | | | No scratch | No scratch | Slightly scratched |
| Blocking resistance | | — | — | No blocking | — | No blocking | Blocking observed |

"—" in the table means no measurement or no evaluation.

The fiber width (on average) of the modified CSNF contained in the dispersion (B) was 2 nm and the fiber length (on average) was 800 nm (determined by observation with an atomic force microscope (AFM) with the number of samples being at 20).

[Evaluations]

The wallpapers obtained in Examples 5-6 and Comparative Example 3 described below were evaluated in the following way. The results are tabulated in Table 2.

(1) Capability of Adsorption

The wallpapers obtained in the respective examples were each cut into a 300 mm square piece, placed in a hermetically sealed bottle of 100 ml along with cotton soaked with 3 drops of 0.1N ammonia water, and allowed to stand over one week. Thereafter, a lid was open to smell an odor.

(2) Capability of Humidity Control

The wallpapers obtained in the respective examples were each cut into a 300 mm square piece and placed in a hermetically sealed bottle of 500 ml along with cotton soaked with 10 ml of water. This was placed in a thermostatic oven at 40° C. for one hour and returned to room temperature, after which waterdrops attached to the side surfaces inside the bottle were observed. When the total area of the side surfaces was taken as 100%, an area ratio of portions attached with the waterdrops was roughly measured.

Example 5

100 parts by mass of an ethylene-vinyl acetate emulsion (solid (resin) concentration: 50 mass %), 50 parts by mass of the dispersion (B) (concentration of the modified CSNF: 1 mass %), 10 parts by mass of a thermally expandable microcapsule foaming agent (F-55, made by Matsumoto Yushi-Seiyaku Co., Ltd.), 80 parts by mass of calcium carbonate (Super SSS, made by Maruo Calcium Co., Ltd.), and 15 parts by mass of titanium oxide (F-76, made by CSS Co., Ltd.) were mixed and dispersed to prepare an aqueous emulsion composition for resin layer formation.

This composition was coated onto a paper substrate having a basis weight of 75 g/m$^2$ and dried and foamed at 175° C. to obtain a wallpaper wherein a resin layer made of a foam was formed on the paper substrate.

Example 6

A wallpaper was obtained in the same manner as in Example 5 except that 25 parts by mass of the dispersion (B) was used in place of 50 parts by mass of the dispersion (A).

Comparative Example 3

A wallpaper wherein a resin layer formed of a foam was formed on a paper substrate was obtained in the same manner as in Example 5 except that 50 parts by mass of water was used in placed of 50 parts by mass of the dispersion (A).

TABLE 2

|  | Example 5 | Example 6 | Comparative Example 3 |
|---|---|---|---|
| Capability of adsorption | Little smell felt | No smell felt | Ammoniacal smell felt |
| Capability of humidity control | 10% | 30% | 100% |

<Discussion>

The result of Table 2 reveals that the wallpapers of Examples 5, 6 having the resin layers containing the modified CSNF are excellent in the capabilities of adsorption and humidity control.

What is claimed is:

1. A resin foam composition, comprising:
   a resin emulsion,
   cellulose nanofibers,
   a crosslinking agent for interfacial crosslinking between the resin and the cellulose nanofibers, and
   an organic solvent in an amount not larger than about 30% mass in 100 mass of the resin foam composition,
   wherein the cellulose nanofibers are modified with a carboxyl group and an amount of the carboxyl group is about 0.1-3.5 mmol/g,
   wherein an amount of the crosslinking agent is 0.01-30 parts by mass per 100 parts by mass of resin in the resin foam composition,
   wherein the crosslinking agent comprises at least one compound having a reactive functional group selected from the group consisting of a carbodiimide group, an oxazoline group, and an isocyanate group,
   wherein a foaming agent is present in an amount of not larger than about 30 parts by mass per 100 parts by mass of the resin, and the foaming agent is a thermally expandable microcapsule foaming agent,
   wherein an amount of the resin is 10 to 80 mass % when the resin foam composition is taken as 100 mass %, and
   wherein the amount of the cellulose nanofibers in the resin foam composition is about 0.2-50 parts by mass, per 100 parts.

2. A foam obtained with the resin foam composition of claim 1.

3. A method for fabricating a foam, comprising the steps of coating on a substrate the resin foam composition of claim 1, and drying the coated resin foam composition.

4. The method for fabricating a foam of claim 3, wherein the substrate is a paper substrate.

5. A wallpaper, comprising:
   a resin layer composition comprising, at least,
   a resin,
   cellulose nanofibers,
   a crosslinking agent, and,
   an organic solvent in an amount not larger than about 30% mass in 100 mass of the resin foam composition,
   wherein the cellulose nanofibers are modified with a carboxyl group and an amount of the carboxyl group is about 0.1-3.5 mmol/g,
   wherein an amount of the crosslinking agent is 0.01 - 30 parts by mass per 100 parts by mass of resin in the resin layer composition,
   wherein the crosslinking agent comprises at least one compound having a reactive functional group selected from the group consisting of a carbodiimide group, an oxazoline group, and an isocyanate group,
   wherein a foaming agent is present in an amount of not larger than about 30 parts by mass per 100 parts by mass of the resin, and the foaming agent is a thermally expandable microcapsule foaming agent,
   wherein an amount of the resin is 10 to 80 mass % when the resin layer composition is taken as 100 mass %, and
   wherein the amount of the cellulose nanofibers in the resin layer composition is about 0.2-50 parts by mass, per 100 parts.

6. The wallpaper of claim 5 wherein the resin layer is made of a foam.

7. The resin foam composition of claim 1, wherein the carboxyl group is a salt.

8. The wallpaper of claim 5, wherein the carboxyl group is a salt.

9. The resin foam composition of claim 1, wherein a foaming ratio of a volume, after foaming, of a foam formed by the resin foam composition to a volume of the resin foaming composition is 3×-5×.

10. The wallpaper of claim 6, wherein a foaming ratio of a volume of the foam after foaming to a volume of a resin foam composition from which the foam is formed is 3×-5×.

* * * * *